Jan. 28, 1958     T. A. SHABARICK     2,821,045
FISH HOOK ATTACHING MEANS FOR LURES
Filed April 29, 1955
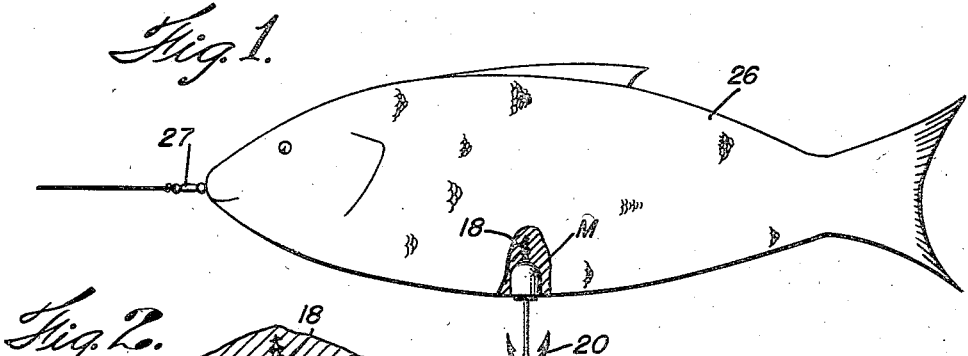
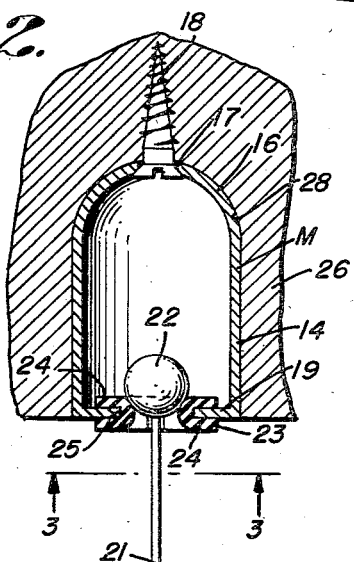
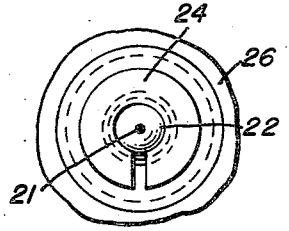
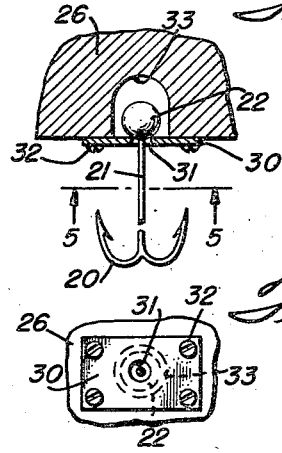
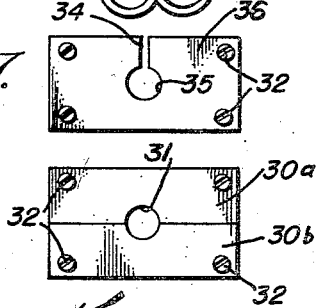
INVENTOR.
TONY A. SHABARICK
BY
Attorney

United States Patent Office 2,821,045
Patented Jan. 28, 1958

2,821,045

FISH HOOK ATTACHING MEANS FOR LURES

Tony A. Shabarick, Los Angeles, Calif.

Application April 29, 1955, Serial No. 504,887

7 Claims. (Cl. 43—42.44)

My invention relates to fish lures, and more particularly to means for swivelly attaching hooks thereto.

It is a purpose of my invention to provide a hook attaching means which is characterized, structurally, by its simplicity, low cost of manufacture, and easy mode of application to a lure and, functionally, by its ability to secure the hook to the lure for free swivelling movement thereon against accidental separation thereof from the lure, and yet allow ready detachment of the hook for purposes of straightening or replacement should it become bent or broken, but more particularly to permit sharpening of the barb of the hook which so frequently is required, and which cannot be achieved while the hook is attached to the lure.

Another purpose of my invention is the provision of a hook attaching means which embodies a hollow member permanently secured within the body of the lure and having an open mouth through which an enlargement fixed on the shank of a hook can be extended into the member, and means associated with the member for confining the enlargement therein so that the hook shank projects therefrom to allow free swivelling movement of the hook, such means being readily detachable from the member by use of a suitable tool to allow detachment of the hook from the lure for replacement, straightening, or resharpening purposes.

A further purpose of my invention is to provide a modified form of hook attaching means for lures which, while embodying substantially the same mechanical principle as the form above described to achieve the same advantage as to ready hook detachability, is greatly simplified in construction to reduce its cost of manufacture as well as being more readily installable on the lure.

I will describe only four forms of hook attaching means for fish lures each embodying my invention, and will then point out the novel features thereof in claims.

In the accompanying drawings:

Fig. 1 is a view showing in side elevation a conventional form of lure, with a portion thereof in section, and having applied thereto one form of hook attaching means embodying my invention.

Fig. 2 is an enlarged fragmentary sectional view of the lure body with the hook attaching means thereon and portions of the latter in section, and other portions in elevation.

Fig. 3 is a horizontal sectional view taken on the line 3—3 of Fig. 2.

Fig. 4 is a view similar to Fig. 2, but on a reduced scale and showing another form of hook attaching means embodying my invention.

Fig. 5 is a horizontal sectional view taken on the line 5—5 of Fig. 4.

Fig. 6 is a bottom plan view of a modification of the plate shown in Fig. 5.

Fig. 7 is a bottom plan of another form of plate.

Referring more particularly to the drawings and to the form of my invention shown in Figs. 1–3, it is shown as comprising a hollow member M preferably constructed of metal and of inverted cup form with a tubular body 14, and a rounded top 16 provided at its crest with an opening 17 for the reception of a screw 18 or other suitable fastening member employed to secure the member to a fish lure as will be later described herein. The lower end or mouth of the member M is partly closed by an element 19 in the form of a flat annular collar integral with and inturned from the lower end of the member.

A fish hook 20, in the present instance a gang hook, has a shank 21 on the free end of which is fixed an enlargement 22 preferably in the form of a metal ball. The diameter of this ball 22 is such that it can be readily passed through the collar 19 for extension thereof into the member M.

For confining or locking the ball 22 within the member M to prevent removal thereof during use of the hook 20 on a fish lure, and yet allow detachment of the hook when required, an element 23 is provided which can be attached to or detached from the collar 19, and when attached blocks the opening in the collar to the extent of preventing the ball from being withdrawn from the member. Additionally, the element 23 forms a seat for the ball which is cupped to allow rocking of the ball in any direction about its own horizontal axis as well as lateral movements of the hook shank 21, resulting in suspending the hook for free swivelling movement from the member M.

The element 23, in the form of a split ring of spring metal, is constructed with peripheral flanges 24, 24, and an intervening peripheral channel or groove 25. The flanges and body of the element are rounded so that the ring at its opposite sides is cupped.

To apply the ring 23 to the collar 19, it is first constricted by the use of a pair of pliers or other suitable tool, and to a diameter such that one flange 24 or the other can pass through the collar and to a position in which the collar is disposed within the ring groove 25. Once the ring is so positioned, it is released permitting it to expand to its normal diameter and thereby becoming locked on the collar with the flanges 24 to opposite sides of the collar thus preventing movement of the ring out of the collar and presenting one cupped side of the ring to the ball upon which it can seat and rock.

In Fig. 1 is illustrated a conventional form of fish lure having a body 26 designed to simulate the appearance of a small fish, and any conventional line securing means 27 applied to the front end of the body. The body 26 is provided on its bottom side with a recess or cavity 28 in which the member M is adapted to be inserted and secured by the screw 18 as shown in Fig. 2. Of course, it will be understood that the ring 23 and the hook 20 with its ball 22 have yet to be applied to the member M, so that a screw driver can be extended into the member to rotate the screw 18 into the lure body.

Following this operation, the ball 22 is extended through the collar 19 into the member M whereupon, the ring 23 is applied to the collar in the manner previously described herein, so as to confine the ball within the member yet allowing the hook shank 21 to extend freely through the ring.

In use of the lure the hook 20 depends from the lure body, the ball 22 seating on the upper cupped side of the ring 23, and since the ball can freely rotate or rock on the ring the hook is swivelly suspended from the lure to minimize disgorging of the hook by a fish. Since both sides of the ring 23 are cupped one may disregard which side is to the inner side of the member M when applying the ring to the collar 19.

Detachment of the hook 20 from the lure body for straightening should it become bent, for replacement should it become broken, or for sharpening should the barbs become dull, which frequently occurs, can be readily effected by removing the ball 22 from the member M. Incident to such removal, the ring 23 is detached from the collar 19 by constricting the ring, through the use of pliers, so that it can be withdrawn from the collar leaving the hook free to be repaired as required.

Referring now to Figs. 4 and 5, I have here shown a modified and structurally simplified form of hook attaching means which includes the same hook 20 with a ball 22 on the shank 21 thereof, but not the member M or the locking element 23. In the place of these parts the attaching means has a single metal plate 30 formed with an opening 31, and which, by screws 32 or other fastening members, is adapted to be secured across the mouth of a cavity 33 in the lure body 26 at the underside thereof so that the opening registers with the cavity. Of course the diameter of the plate opening 31 is less than the diameter of the cavity mouth as well as that of the ball 22.

Incident to installing this form of hook attaching means on the lure, it is first necessary to assemble the hook 20 and the plate 30. This can be done by extending the hook 21 through the plate opening 31 without the ball 22 on the shank, the subsequent forming or mounting the ball on the shank serving to lock the plate on the shank.

Once these parts are so assembled they can be installed on the lure by first extending the ball 22 into the cavity 33 and then screwing the plate 30 to the lower body as above described, with the hook depending therefrom and the ball confined in the cavity by the plate although freely movable therein to allow free swivelling movement of the hook as intended.

Another method of hook and plate assembly which permits the ball to be formed on the hook shank before it is associated with the plate or the lure body is to make the plate in two identical parts 30a and 30b, as illustrated in Fig. 6. One half of the opening 31 is formed in one part, and the other half in the other part. Thus, when installing the hook on the lure, the ball 22 can be first extended into the cavity 33, whereupon the parts of the plate are secured to the lure body so that the hook shank extends through the opening 31 leaving the hook 20 dependent from the hook body for free swivelling movement.

A further method of hook and plate assembly which provides the same advantage as the plate of Fig. 6, yet avoids making it in two parts, is the plate 36 shown in Fig. 7. This plate is formed in a single piece, and with an opening 35 smaller than the ball 22, and a slot 34 that leads from the opening to one edge of the plate.

A plate of this construction permits the hook 20 with the ball 22 already formed thereon, to be mounted on the shank 21 merely by extending the shank laterally through the slot 34 and into the opening 35. Once the plate is so mounted it is secured by the screws 32 to the lure body 26 in a position such that the opening 35 registers with the cavity 33, while the slot 34 extends to one side of the cavity and is thus closed against the shank 21 moving laterally out of the opening.

Whether the plate is made in one or two parts, detachment of the hook from the lure body for purposes of sharpening, straightening or replacement merely requires detachment of the plate from the lure body when the ball with the hook thereon can be withdrawn from the cavity 33.

Although I have herein shown and described only four forms of hook attaching means for fish lures each embodying my invention, it is to be understood that various changes and modifications may be made therein without departing from the spirit of the invention and the spirit and scope of the appended claims.

What I claim is:

1. A fishing lure comprising in combination a lure body having a cavity therein, a hook member having a shank of predetermined diameter and terminating at one end in a hook bill, a ball head member fixed to the other end of the shank and disposed within said cavity, said cavity being of a size as to width and depth relative to the size of the head member whereby the head member has substantial movement axially and transversely therein, and a member closing the outer end of the cavity for preventing escape of said head member therefrom and having an opening smaller than the head member in and through which said hook shank has free movement, said opening being at least twice the diameter of the hook shank and said hook shank being freely movable through the major portion of its length and freely radially movable in all directions in and from the center of the opening.

2. For application to a lure body having a cavity therein; a fishing hook including a shank of predetermined diameter and having a hook bill at one end, a ball head fixed to the other end of the shank and of a size substantially smaller than the depth and width of the cavity, a member adapted for attachment to the lure body and designed to close the cavity, means for effecting the attachment of the member to the body, said member having an opening at least twice the diameter of the shank through which said shank freely extends and said opening being of a size smaller than said head whereby to maintain the hook and member coupled together, the hook shank being freely longitudinally movable through the major portion of its length and freely radially movable in all directions in and from the center of the opening, and said head being adapted to be disposed in the cavity when the member is secured to the lure body in closing position over the cavity.

3. The invention according to claim 2 wherein said member embodies a plate for covering the cavity and the means for effecting said attachment is a screw passing through a part of the member.

4. The invention according to claim 3 wherein said plate has a slot opening through an edge thereof and leading into said opening, said slot facilitating insertion of the hook shank into and its removal from the opening.

5. The invention according to claim 2 wherein said member embodies a plate having two parts in edge opposed relation with a portion of said opening formed in each of the opposed edges and the means for effecting said attachment is a screw passing through the parts of the plate member.

6. The invention according to claim 2 wherein said member embodies a hollow tubular body of inverted cup form for insertion into the cavity in the lure body, the said opening being in one end of the hollow tubular body and the said means for effecting said attachment is a screw, the other end of the tubular body having an opening to receive the screw for its extension into the lure body.

7. The invention according to claim 1 wherein said member embodies a hollow tubular body of inverted cup form for insertion into the cavity in the lure body, the said opening being formed by an inturned annular flange defining one end of the tubular body and a radially split peripherally channeled spring metal ring within the annular flange and having the flange engaged in the peripheral channel thereof and the said means for effecting said attachment is a screw, the other end of the tubular body having an opening to receive the screw for its extension into the lure body.

References Cited in the file of this patent

UNITED STATES PATENTS

| 696,433 | Heddon | Apr. 1, 1902 |
|---|---|---|
| 800,536 | Bailey | Sept. 26, 1905 |
| 1,744,366 | Davenport | Jan. 21, 1930 |
| 1,895,301 | Vandermark | Jan. 24, 1933 |
| 1,993,798 | Peterson | Mar. 12, 1935 |
| 2,563,533 | Knox | Aug. 7, 1951 |
| 2,763,089 | McDonald | Sept. 18, 1956 |

FOREIGN PATENTS

| 75,743 | Norway | Oct. 10, 1949 |